United States Patent
Hammond-Cunningham et al.

(10) Patent No.: US 10,074,839 B2
(45) Date of Patent: Sep. 11, 2018

(54) LITHIUM-AIR BATTERY SEPARATORS AND RELATED COMPOSITIONS

(71) Applicant: Massachusetts Institute of Technology, Cambridge, MA (US)

(72) Inventors: Paula T. Hammond-Cunningham, Newton, MA (US); Sun Hwa Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 132 days.

(21) Appl. No.: 15/220,237

(22) Filed: Jul. 26, 2016

(65) Prior Publication Data

US 2018/0034031 A1    Feb. 1, 2018

(51) Int. Cl.
  *H01M 2/16*    (2006.01)
  *H01M 12/08*   (2006.01)
  (Continued)

(52) U.S. Cl.
  CPC .......... *H01M 2/1666* (2013.01); *B32B 3/26* (2013.01); *B32B 7/12* (2013.01); *B32B 9/045* (2013.01);
  (Continued)

(58) Field of Classification Search
  CPC ........ H01M 2/14; H01M 2/1653; H01M 2/18; H01M 2/1666; H01M 12/02; H01M 12/08
  See application file for complete search history.

(56) References Cited

U.S. PATENT DOCUMENTS

| 7,799,467 B2 | 9/2010 | DeLongchamp et al. |
| 8,689,726 B2 | 4/2014 | Krogman et al. |

(Continued)

FOREIGN PATENT DOCUMENTS

WO    WO 2014/107433 A2    7/2014

OTHER PUBLICATIONS

Wang et al., Mussel Inspired Modification of Polypropylene Separators by Catechol/Polyamine for Li-Ion Batteries. ACS Applied Materials and Interfaces. 2014, 6, 5602-5608 (Year: 2014).*

(Continued)

*Primary Examiner* — Matthew J Merkling
(74) *Attorney, Agent, or Firm* — Wolf, Greenfield & Sacks, P.C.

(57) ABSTRACT

Battery separators for lithium-air batteries are provided. In some embodiments, a lithium-air battery may comprise one or more electrochemical cells including an anode, a cathode, an electrolyte, and a battery separator positioned between the anode and the cathode. The battery separator may comprise a porous membrane having a lithium ion conductive film on at least a portion of the porous membrane. The lithium ion conductive film may comprise layers designed to impart beneficial properties to the porous membrane and/or battery, such as resistance to dendrite formation, while having relatively minimal or no adverse effects on one or more important properties of the porous membrane (e.g., ionic conductivity, electrolyte permeability, weight, mechanical stability) and/or the overall battery. The respective characteristics and number of the layers in the lithium ion conductive film may be selected to impart desirable properties to the battery separator and/or the battery while having relatively minimal or no adverse effects.

23 Claims, 12 Drawing Sheets

(51) Int. Cl.

| | | |
|---|---|---|
| H01M 12/02 | (2006.01) | |
| H01M 8/10 | (2016.01) | |
| B32B 7/12 | (2006.01) | |
| B32B 27/06 | (2006.01) | |
| B32B 27/28 | (2006.01) | |
| B32B 27/32 | (2006.01) | |
| B32B 9/04 | (2006.01) | |
| B32B 3/26 | (2006.01) | |
| H01M 2/18 | (2006.01) | |
| H01M 8/1053 | (2016.01) | |
| H01M 8/106 | (2016.01) | |
| H01M 8/1018 | (2016.01) | |

(52) U.S. Cl.
CPC .......... *B32B 27/06* (2013.01); *B32B 27/285* (2013.01); *B32B 27/32* (2013.01); *H01M 2/1653* (2013.01); *H01M 2/18* (2013.01); *H01M 8/106* (2013.01); *H01M 8/1053* (2013.01); *H01M 12/02* (2013.01); *H01M 12/08* (2013.01); *B32B 2250/42* (2013.01); *B32B 2255/10* (2013.01); *B32B 2307/206* (2013.01); *B32B 2457/10* (2013.01); *B32B 2457/18* (2013.01); *H01M 2008/1095* (2013.01); *H01M 2300/0082* (2013.01); *H01M 2300/0097* (2013.01)

(56) References Cited

U.S. PATENT DOCUMENTS

| | | | |
|---|---|---|---|
| 9,136,561 | B2 | 9/2015 | Tsai et al. |
| 9,705,167 | B2 | 7/2017 | Khiterer et al. |
| 2004/0149572 | A1 | 8/2004 | Schlenoff et al. |
| 2010/0055564 | A1 | 3/2010 | Tokunaga et al. |
| 2011/0033746 | A1 | 2/2011 | Liu et al. |
| 2011/0269010 | A1 | 11/2011 | Sawaguchi et al. |
| 2012/0088163 | A1 | 4/2012 | Ryu et al. |
| 2013/0017432 | A1 | 1/2013 | Roumi |
| 2013/0309571 | A1 | 11/2013 | Yoon et al. |
| 2014/0072884 | A1 | 3/2014 | Zhang et al. |
| 2014/0186724 | A1 | 7/2014 | Hammond et al. |
| 2017/0365900 | A1 | 12/2017 | Khiterer et al. |

OTHER PUBLICATIONS

DeLongchamp et al., Highly ion conductive poly(ethylene oxide)-based solid polymer electrolytes from hydrogen bonding layer-by-layer assembly. Langmuir. Jun. 22, 2004;20(13):5403-11.

Dikin et al., Preparation and characterization of graphene oxide paper. Nature. Jul. 26, 2007;448(7152):457-60.

Evans et al., Electrochemical measurement of transference numbers in polymer electrolytes. Polymer. Dec. 1987;28(13):2324-28.

Lee et al., Li-Anode protective layers for Li rechargeable batteries via layer-by-layer approaches. Chem Mater. 2014;26:2579-85.

Liu et al., Spray layer-by-layer electrospun composite proton exchange membranes. Adv Funct Mater. Jun. 25, 2013;23(24):3087-95.

Mannarino et al., Mechanical and transport properties of layer-by-layer electrospun composite proton exchange membranes for fuel cell applications. ACS Appl Mater Interfaces. Aug. 28, 2013;5(16):8155-64. doi: 10.1021/am402204v. Epub Jul. 22, 2013.

Park et al., Aqueous suspension and characterization of chemically modified graphene sheets. Chem Mater. 2008;20(21):6592-94. Epub Oct. 23, 2008.

Seo et al., Effect of the layer-by-layer (LbL) deposition method on the surface morphology and wetting behavior of hydrophobically modified PEO and PAA LbL films. Langmuir. Jul. 2008;24(15):7995-8000.

Sukhishvili et al., Layered, erasable, ultrathin polymer films. J Am Chem Soc. 2000;122(39):9550-1. Epub Sep. 14, 2000.

Sukhishvili et al., Layered, erasable polymer multilayers formed by hydrogen-bonded sequential self-assembly. Macromolecules Jan. 2002;35(1):301-10. Epub Dec. 5, 2001.

Tang et al., Nanostructured artificial nacre. Nat Mater. Jun. 2003;2(6):413-18. Suppl Info 1 pg. Epub May 25, 2003.

Uthaisar et al., Edge effects on the characteristics of Li diffusion in graphene. Nano Lett. 2010;10(8):2838-42. Epub Jul. 12, 2010.

Yang et al., A high-performance graphene oxide-doped ion gel as gel polymer electrolyte for all-solid-state supercapacitor applications. Adv Funct Mater. Jul. 12, 2013;23(26):3353-60.

Zhou et al., Graphene modified $LiFePO_4$ cathode materials for high power lithium ion batteries. J Mater Chem. 2011;21:3353-8. Epub Jan. 24, 2011.

Barroso-Bujans et al., Macromolecular structure and vibrational dynamics of confined poly(ethylene oxide): from subnanometer 2D-intercalation into graphite oxide to surface adsorption onto graphene sheets. ACS Macro Lett. 2012; 1(5): 550-4. doi: 10.1021/mz3001012.

DeLongchamp et al., Highly ion conductive poly(ethylene oxide)-based solid polymer electrolytes from hydrogen bonding layer-by-layer assembly. Langmuir. Jun. 22, 2004;20(13):5403-11. Epub May 18, 2004.

Kulkarni et al., Graphene oxide-polyelectrolyte nanomembranes. ACS Nano, 2010, 4(8): 4667-76. doi: 10.1021/nn101204d.

Lee et al., Substrate-independent layer-by-layer assembly by using mussel-adhesive-inspired polymers. Adv Mater. May 5, 2008;20(9):1619-23, Author Manuscript, PMC Jan. 4, 2012, 10 pages.

Lutkenhaus et al., Elastomeric flexible free-standing hydrogen-bonded nanoscale assemblies. J Am Chem Soc. Dec. 14, 2005;127(49):17228-34. Epub Nov. 17, 2005.

Ryou et al., Excellent cycle life of lithium-metal anodes in lithium-ion batteries with mussel-inspired polydopamine-coated separators. Adv. Energy Mater. 2012, 2:645-50. doi:10.1002/aenm.201100687.

Ryou et al., Mussel-inspired polydopamine-treated polyethylene separators for high-power li-ion batteries. Adv Mater. Jul. 19, 2011;23(27):3066-70. doi: 10.1002/adma.201100303. Epub May 24, 2011.

Zhang et al., Li/polymer electrolyte/water stable lithium-conducting glass ceramics composite for lithium-air secondary batteries with an aqueous electrolyte. J. Electrochem. Soc. 2008, 155(12): A965-9. Epub Oct. 14, 2008.

\* cited by examiner

LITHIUM-AIR BATTERY SEPARATORS AND RELATED COMPOSITIONS

TECHNICAL FIELD

Lithium-air battery separators and related compositions and methods are generally described.

BACKGROUND

Concerns regarding global climate change coupled with increased energy consumption have galvanized the search for sustainable alternative energy conversion and storage systems. Much attention has been directed to the use of lithium batteries, such as lithium-ion batteries. While lithium-ion batteries have been shown to have a high energy density and efficiency, the current energy storage capability of lithium-ion batteries is not sufficient for certain applications, such as batteries for electrical vehicles. To address this deficiency, lithium-air batteries have emerged as a viable alternative to lithium-ion batteries for certain applications, due to the relatively high energy storage capacity compared to other rechargeable batteries.

Lithium-air batteries use the oxidation of lithium metal at the anode and the reduction of oxygen from air at the cathode to induce current flow. Theoretically, the specific energy possible with lithium-air batteries is comparable to the specific energy of gasoline. Thus, lithium-air batteries have the potential to provide electric vehicles with substantially the same range as gasoline vehicles. However, the high reactivity of lithium metal has hampered its use in commercial batteries. Lithium metal anodes, such as those used in lithium-air batteries, are known to decompose many battery electrolytes and form dendritic growths that short circuit the battery, thereby limiting battery lifetime. Accordingly, improved compositions that extend battery lifetime without compromising performance are needed.

SUMMARY

Lithium-air battery separators and related compositions and methods are provided. The subject matter of the present invention involves, in some cases, interrelated products, alternative solutions to a particular problem, and/or a plurality of different uses of one or more systems and/or articles.

In one set of embodiments, lithium-air battery separators are provided. In one embodiment, a lithium-air battery separator comprises a porous membrane and a lithium ion conductive film on at least a portion of a surface of the porous membrane, wherein the film comprises a first and a second adhesive layer comprising a polymer having one or more catechol groups, a barrier layer, and a lithium ion conductive layer positioned between the first and the second adhesive layers.

In another embodiment, a lithium-air battery separator comprises a porous membrane and a lithium ion conductive film comprising two or more repeating core units, wherein the repeating core unit comprises a graphene oxide layer, a polyethylene oxide layer, and two adhesive layers comprising a polymer comprising polyethylene oxide and catechol groups.

In one set of embodiments, articles are provided. In one embodiment, an article comprises a porous membrane and a lithium ion conductive material associated with the porous membrane, wherein the material comprises a first and a second adhesive layer, wherein at least one of the first and second adhesive layers comprising a polymer having one or more catechol groups, and a barrier layer positioned adjacent to the first and/or the second adhesive layers.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
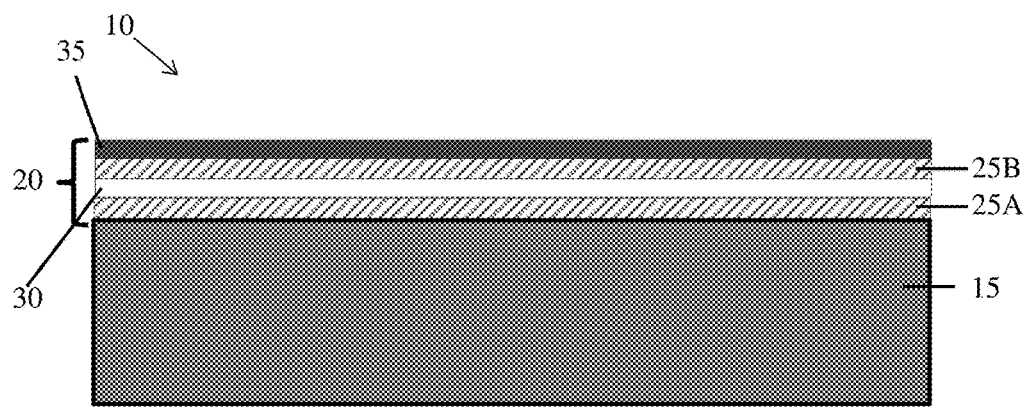
FIG. 1 shows a battery separator, according to certain embodiments.

Battery separators for lithium-air batteries are provided. In some embodiments, a lithium-air battery may comprise one or more electrochemical cells including an anode, a cathode, an electrolyte, and a battery separator positioned between the anode and the cathode. The battery separator may comprise a porous membrane having a lithium ion conductive film on at least a portion of the porous membrane. The lithium ion conductive film may comprise layers designed to impart beneficial properties to the porous membrane and/or battery, such as resistance to dendrite formation, while having relatively minimal or no adverse effects on one or more important properties of the porous membrane (e.g., ionic conductivity, electrolyte permeability, weight, mechanical stability) and/or the overall battery. For example, the lithium ion conductive film may comprise one or more adhesive layers that serve to enhance the mechanical properties of the film, improve ion conductivity of the battery separator, and/or significantly reduce film manufacturing time. In some embodiments, the lithium ion conductive film may also comprise one or more barrier layers (e.g., graphene oxide layers) that impart mechanical strength (e.g., toughness, elastic modulus) to the battery separator and act as a barrier to lithium dendritic growth through the battery separator. In certain embodiments, the lithium ion conductive film may also comprise a lithium ion conductive layer (e.g., polyethylene oxide layer) that promotes lithium ion transport and enhances the ion conductivity of the battery separator. The respective characteristics and number of the layers in the lithium ion conductive film may be selected to impart desirable properties to the battery separator and/or the battery while having relatively minimal or no adverse effects.

In general, battery separators serve to mechanically and/ or electrically isolate the anode from the cathode, while allowing ionic conduction. The structural, mechanical, and/ or chemical properties of battery separators are selected to minimize adverse effects on battery performance (e.g., electrical resistance, lifetime). However, in batteries comprising highly reactive components, such as lithium metal, a trade-off often exists between sufficient isolation and overall battery properties. For instance, some conventional lithium-air batteries utilize brittle ceramic separators that significantly increase the weight and fragility of the battery, limiting the suitability of the battery for certain applications.

In the present disclosure, lithium-air battery separators and batteries that do not suffer from one or more limitations of conventional lithium-air battery separators and/or batteries are generally described. As described in more detail herein, it has been discovered that a film (e.g., layer-by-layer film) comprising a certain adhesive layer in combination with at least one other layer (e.g., barrier layer, lithium ion conductive layer) can be used to impart beneficial properties to a battery separator and/or the overall battery. In some embodiments, the adhesive layer(s) may comprise a polymer designed to uniformly coat and adhere to at least a portion of the surface(s) of the porous membrane (e.g., entire surface area), enhance the mechanical integrity of the film and/or battery separator by forming non-covalent and/or covalent crosslinks, and improve the ion conductivity (e.g., lithium ion conductivity) of the battery separator. In some such embodiments, the polymer may comprise one or more pendant and/or backbone catechol groups that allow the polymer to coat and adhere to the porous membrane. The catechol groups may also allow for the formation of covalent crosslinks between polymers comprising catechol groups in the same layer or complementary functional groups in a different layer. The polymer may also comprise an ion conductive repeat unit or block, such as ethylene oxide or polyethylene oxide, respectively, that promotes lithium ion transport.

A non-limiting example of a battery separator comprising a porous membrane having a lithium ion conductive film on at least a portion on the surface(s) of the porous membrane is shown in FIG. 1. In some embodiments, a battery separator 10 may include a porous membrane 15. In certain embodiments, porous membrane 15 may be a polymer membrane. For instance, the porous membrane may comprise one or more polyolefins (e.g., polypropylene). At least a portion of one or more surfaces (e.g., one exterior surface, two or more exterior surfaces, all exterior surfaces) of porous membrane 15 may be coated with lithium ion conductive film 20. For instance, the lithium ion conductive film may cover at least about 90% of at least one surface (e.g., at least about 90% of at least two surface, at least about 90% of at least one or two exterior surfaces, at least about 90% of the surface area of the porous membrane) of the porous membrane. In some embodiments, the lithium ion conductive film may be relatively thin (e.g., less than or equal to about 5 microns, less than or equal to about 1 microns). In some such embodiments, the lithium ion conductive layer may impart beneficial properties to the membrane, while having minimal or no adverse effects on properties of the porous membrane (e.g., volume, weight, size, permeability, ion conductivity).

In some embodiments, lithium ion conductive film 20 may comprise layers that impart beneficial properties, such as high lithium ion conductivity and resistance to Li dendrite formation, to the porous membrane. For instance, in some embodiments, lithium ion conductive film 20 may comprise two or more adhesive layers 25A and 25B that serve, e.g., to uniformly and securely adhere the film to the surface of the porous membrane and/or impart mechanical integrity to the film. For example, as shown in FIG. 1, adhesive layer 25A may be adjacent to porous membrane 15. The adhesive layer may comprise a polymer having one or catechol groups (e.g., pendant catechol groups), which serve to non-covalently adhere or otherwise attach the layer uniformly to the surface of the porous membrane. In some embodiments, the polymer may comprise one or more repeat units comprising a catechol group, such as a polyacrylic acid block functionalized with one or more catechol groups (e.g., a polyacrylic acid comprising one or more catechol group, PAA-catechol, PAAC), a polyvinyl chloride block functionalized with one or more catechol groups (e.g., a polyvinyl chloride comprising one or more catechol group), or a poly(allylamine) block functionalized with one or more catechol groups (e.g., a poly(allylamine) comprising one or more catechol group).

In general, any suitable copolymer comprising a lithium ion conductive block (e.g., PEO) and a block capable of being functionalized with one or more catechol groups (e.g., polyacrylic acid, poly(allylamine), polyvinyl chloride) can be used. Non-limiting examples of suitable polymers for the adhesive layer include polyethylene oxide/polyacrylic acid comprising catechol groups block copolymer (PEO-PAAC), polyethylene oxide/poly(allylamine) comprising catechol groups block copolymer, and polyethylene oxide/polyvinyl chloride comprising catechol groups block copolymer. In some embodiments, an adhesive layer is not adjacent to the porous membrane.

In certain embodiments, the polymer in the adhesive layer may comprise functional groups that allow the polymer to interact with material in another layer (e.g., an adjacent layer, an adhesive layer) or within the adhesive layer. For instance, in certain embodiments, the adhesive layer may comprise crosslinks (e.g., covalent crosslinks) within the adhesive layer. The crosslinks may be formed between catechol groups of polymers in the adhesive layer. A cross-linked adhesive layer may have enhanced mechanical and barrier properties compared to an essentially identical adhesive layer lacking crosslinks. In general, catechol groups may be induced to crosslink using any suitable method, including, but not limited to, elevated temperatures.

In embodiments, the polymer in the adhesive layer may comprise functional groups that allow the polymer to interact with material in an adjacent layer. For instance, a polymer in adhesive layer 25A and/or 25B may comprise functional groups that are complementary to functional groups in layer 30. The functional groups in layer 25A and/or 25B and the complementary functional groups in layer 30 may interact to form crosslinks (e.g., non-covalent crosslinks), which serve to anchor layer 30 to layer 25A and/or to anchor layer 30 to layer 25B. In some embodiments, the crosslinks may be non-covalent crosslinks formed via hydrogen bonding interactions and/or electrostatic interactions. As another example, a polymer in adhesive layer 25B may comprise functional groups that are complementary to functional groups in layer 35. The functional groups in layer 25B and the complementary functional groups in layer 35 may interact to form crosslinks (e.g., covalent crosslinks, noncovalent), which serve to anchor layer 35 to layer 25B. In some embodiments, the crosslinks may be covalent crosslinks. In some embodiments, a lithium ion conductive film having crosslinks between layers may have enhanced mechanical and barrier properties compared to an essentially identical film lacking crosslinks.

In some embodiments, a polymer in the adhesive layer may comprise functional groups that allow the polymer to interact with material in a non-adjacent layer.

In some embodiments, lithium ion conductive film 20 may comprise one or more lithium ion conductive layers (e.g., polyethylene oxide layer). In some embodiments, the lithium ion conductive layer may be positioned between the adhesive layers. For instance, as shown in FIG. 1, the lithium ion conductive layer may be adjacent to at least one adhesive layer (e.g., two adhesive layers). In other embodiments, the lithium ion conductive layer is not positioned between adhesive layers. In some such embodiments, the lithium ion conductive layer may not be adjacent to at least one adhesive layer. In some embodiments, the lithium ion conductive layer may be positioned between an adhesive layer and a barrier layer. In general, the lithium ion conductive layer may comprise one or more polymers that promote lithium ion transport and/or comprise functional groups that are complementary to a material in another layer (e.g., adjacent layer). Non-limiting examples of suitable polymers for the lithium ion conductive layer include polyethylene oxide (PEO), polystyrene sulfonate, nafion, polysulfone, and polypyrrole.

In some embodiments, lithium ion conductive film 20 may comprise one or more barrier layers (e.g., graphene oxide layer). In some embodiments, the barrier layer may comprise organic material. For instance, the barrier layer may consist essentially of organic material, such as graphene oxide, and may not comprise inorganic material. In other embodiments, the barrier layer may comprise inorganic material. Barrier layer 35 may impart mechanical strength to the battery separator and serve to inhibit or reduce Li dendrite formation, leading to the lithium-air battery having a relatively high lifetime and/or cyclability. In some embodiments, barrier layer 35 may be positioned adjacent to one or more adhesive layers (e.g., adhesive layer 25B), as shown in FIG. 1. In other embodiments, barrier layer 35 may not be positioned adjacent to an adhesive layer.

In some embodiments, lithium ion conductive film 20 may also comprise one or more additional layers. In general, the lithium ion conductive film 20 may comprise any suitable additional layer(s) (e.g., adhesive layer, barrier layer, lithium ion conductive layer). In some embodiments, the lithium ion conductive film may comprise a repeating pattern of layers. For instance, the pattern core (e.g., the smallest part of the pattern that repeats) may comprise two or more layers (e.g., three or more layers, four or more layers, four layers). For example, the pattern core, also referred to as a repeating core unit, may comprise two adhesive layers, a barrier layer, and/or a lithium ion conductive layer. In some such embodiments, the layers in the repeating core unit may be arranged as shown in FIG. 1. That is, the lithium ion conductive layer may be positioned between the two adhesive layers, the lithium ion conductive layer may be adjacent to two adhesive layers, and the barrier layer may be adjacent to an adhesive layer. In general, the lithium ion conductive film may have any suitable number of repeating core units. For instance, in some embodiments, the lithium ion conductive film may have greater than or equal to about 2, greater than or equal to about 4, greater than or equal to about 5, greater than or equal to about 6, greater than or equal to about 8, greater than or equal to about 10, greater than or equal to about 15, greater than or equal to about 20, greater than or equal to about 30, greater than or equal to about 40, or greater than or equal to about 50 and/or less than or equal to about 100 repeating core units (e.g., less than or equal to about 80 repeating core units, less than or equal to about 60 repeating core units, less than or equal to about 40 repeating core units). In certain embodiments, the lithium ion conductive film may have greater than or equal to about 20 repeating core units and less than or equal to about 40 repeating core units (e.g., greater than or equal to about 20 repeating core units and less than or equal to about 30 repeating core units).

It should be understood that the configurations of the layers shown in FIG. 1 are by way of example only, and that in other embodiments, lithium ion conductive films including other configurations of layers may be possible. For example, while the layers are shown in a specific order in FIG. 1, other configurations are also possible. Furthermore, in some embodiments, additional layers may be present in addition to the ones shown in the figures. It should also be appreciated that not all components shown in the figures need be present in some embodiments.

In some embodiments, the lithium ion conductive film may be formed by layer-by-layer assembly. Layer-by-layer (LbL) assembly is a directed assembly technique for fabricating stable films with nanometer scale control of film composition using complementary chemical interaction. Layer-by-layer (LbL) assembly uses the sequential adsorption of materials having affinity for each other (e.g., due to complementary functional groups) to build films one layer at a time. In general, any suitable complementary interaction, including hydrogen bonding, van der Waals forces, and bimolecular recognition can be utilized.

For instance, electrostatic LbL assembly utilizes ionic interactions to form stable films through the alternating adsorption of oppositely charged species (e.g., polyelectrolytes). For example, an anionic substrate may be exposed to polycation solution and rinsed, then exposed to polyanion solution and rinsed. Each exposure results in the reproducible and conformal deposition of an overcompensating layer of polyion, so that surface charge reversal is assured. This cycle can be repeated for a nominal number of layer pairs and provides control over film thickness and compositional variation normal to the substrate. Similarly, as another example, hydrogen bonding LbL assembly utilizes hydrogen donor and hydrogen acceptor interactions to form stable films through the alternating adsorption of hydrogen donors and hydrogen acceptors.

In some embodiments, the LbL film may be formed using non-covalent interaction, such as hydrogen bonding, ionic interactions, dative bonds, and/or Van der Waals interactions. In some embodiments, the material in the layers of the lithium ion conductive film comprises functional groups capable of forming such bonds. For example, a functional group in one layer may form a hydrogen-bond with a complementary functional group in another layer. Functional groups capable of forming hydrogen-bonds include hydrogen-bond donors and acceptors. Those of ordinary skill in the art will be able to identify hydrogen-bond donors and acceptors suitable for use in the present invention. In some instances, a hydrogen-bond donor may comprise at least one hydrogen atom capable of associating with a pair of electrons on a hydrogen-bond acceptor to form the hydrogen bond. Non-limiting examples of functional groups which may form hydrogen bonds include carbonyl groups, ether groups, amines, hydroxyls, and the like.

It should be understood that covalent and non-covalent bonds between functional groups and complementary functional groups may be formed by any type of reactions, as known to those of ordinary skill in the art, using the appropriate functional groups to undergo such reactions. Chemical interactions suitable for use with various embodiments described herein can be selected readily by those of ordinary skill in the art, based upon the description herein.

For example, the adhesive layer may comprise a polymer (e.g., PEO-PAAC) that includes at least one hydrogen atom capable of interacting with a pair of electrons on a hydrogen-bond acceptor in the lithium ion conductive layer to form a hydrogen bond. In some such embodiments, an adhesive layer may be hydrogen bonded via a plurality of hydrogen bonds (e.g., greater than or equal to about 10 hydrogen bonds, greater than or equal to about 20 hydrogen bonds, greater than or equal to about 50 hydrogen bonds) to a lithium ion conductive layer. In some cases, a barrier layer may be hydrogen bonded to via a plurality of hydrogen bonds (e.g., greater than or equal to about 10 hydrogen bonds, greater than or equal to about 20 hydrogen bonds, greater than or equal to about 50 hydrogen bonds) to a lithium ion conductive layer. In some embodiments, one or more layers of the lithium ion conductive film may include an electron-rich or electron-poor functional group, such that it may form an electrostatic interaction with another layer.

LbL films can be formed in many different ways including dip-coating, spray-coating, and spin-coating. In dip-coating, a substrate is immersed in a solution containing a first coating material. The substrate can remain in the solution for a while before being pulled up. Excess liquid on the surface of the substrate can be washed, drained, or evaporated. The substrate is then immersed in a solution containing a second coating material. The process may be repeated until the desired number of layers is formed. Spray LbL method uses spraying, instead of dipping, of solutions or suspensions. Spray LbL methods are further described in U.S. Pat. No. 8,689,726, filed Jul. 6, 2012, and entitled "Automated layer by layer spray technology," which is incorporated by reference herein in its entirety. Spin coating is a procedure where an excess amount of a solution is placed on the substrate, which is then rotated at high speed to spread the fluid by centrifugal force. In addition to aqueous solutions, aqueous suspensions and non-aqueous solvents can also be used for LbL assembly.

As described herein, the battery separator may comprise a porous membrane. In some embodiments, the porous membrane may be a conventional battery separator. In general, any porous membrane suitable for use in lithium-air batteries may be used. In some embodiments, the membrane comprises one or more polymers. In certain embodiments, the membrane comprises organic material. In some such embodiments, the membrane may consist essentially of organic material. For example, the membrane may consist essentially of one or more polymer (e.g., one polymer, two or more polymers). In certain embodiments, the membrane comprises organic and inorganic material. In some embodiments, the membrane does not comprise a ceramic material. Non-limiting examples of suitable polymers include polyolefins (e.g., polypropylene, polyethylene), microporous poly(methyl methacrylate)-grafted and siloxane grafted polyethylene, polyvinylidene fluoride, poly(tetrafluoroethylene), poly(vinyl chloride), and polytriphenylamine-modified polymers, amongst others. In some embodiments, the membrane may comprise polypropylene.

As described herein, the lithium ion conductive film may coat at least a portion of one or more surfaces of the porous membrane. In some embodiments, the film may cover a relatively large fraction of one or more surfaces (e.g., exterior surfaces) or the total surface area of the porous membrane. For instance, in some embodiments, greater than or equal to about 40%, greater than or equal to about 50%, greater than or equal to about 60%, greater than or equal to about 70%, greater than or equal to about 80%, greater than or equal to about 90%, greater than or equal to about 95%, greater than or equal to about 97%, or greater than or equal to about 99% of the surface area of one or more surfaces (e.g., exterior surface) and/or the total surface area of the porous membrane may be covered by the lithium ion conductive film. In certain embodiments, the entire surface area of one or more surfaces (e.g., two or more surfaces, two or more exterior surfaces) and/or the total surface area of the porous membrane may be covered by the lithium ion conductive film. The percent coverage of the porous membrane may be determined using scanning electron microscopy techniques.

As described herein, an adhesive layer may comprise a polymer comprising one or more catechol groups. The catechol may be in the polymer backbone and/or be a pendant group. In some instances, the catechol group is in one or more side chains of the polymer. In some embodiments, the catechol group may be a catecholamine, such as dopamine or an analog thereof. Non-limiting examples of catechol molecules that may be used to form a catechol group, as described herein, include dopamine and analogs thereof, L-3,4-dihydroxyphenylalanine, norepinephrine, epinephrine, 3-(3,4-dihydroxyphenyl)-2-methyl-L-alanine, and dihydrocaffeic acid.

Polymers, as described herein, are generally extended molecular structures comprising backbones which optionally contain pendant side groups or chains, wherein the term backbone is given its ordinary meaning as used in the art, e.g., a linear chain of atoms within the polymer by which other chains may be regarded as being pendant. Typically, but not always, the backbone is the longest chain of atoms within the polymer. A polymer may be a co-polymer, for example, a block, alternating, or random co-polymer. Polymers may be obtained from natural sources or be created synthetically. In some embodiments, the polymer may be acyclic or cyclic. A polymer may be cross-linked, for example, through covalent bonds or non-covalent bonds (e.g., ionic bonds, hydrophobic bonds, metal binding). In some embodiments, the polymers in the lithium ion conductive film or a layer may not be cross-linked. In other embodiments, the polymers in the lithium ion conductive film or a layer may be cross-linked. In embodiments in which at least a portion of the polymers in the lithium ion conductive film or a layer are cross-linked, the polymers may be non-covalently cross-linked. In some embodiments, at least a portion of the polymers in a layer are covalently cross-linked.

In general, the polymers, described herein, may have any suitable molecular weight. For example, in some embodiments, the number average molecular weight of one or more polymers in the lithium ion conductive film may be greater than or equal to about 3,000 g/mol, greater than or equal to about 5,000 g/mol, greater than or equal to about 10,000 g/mol, greater than or equal to about 25,000 g/mol, greater than or equal to about 50,000 g/mol, about 70,000 g/mol, greater than or equal to about 100,000 g/mol, greater than or equal to about 250,000 g/mol, or greater than or equal to about 500,000 g/mol. In some instances, the number average molecular weight of one or more polymers in the lithium ion conductive film may be less than or equal to about 1,000,000 g/mol, less than or equal to about 750,000 g/mol, less than or equal to about 500,000 g/mol, less than or equal to about 250,000 g/mol, less than or equal to about 100,000 g/mol, less than or equal to about 75,000 g/mol, less than or equal to about 50,000 g/mol, or less than or equal to about 25,000 g/mol. Combinations of the above-referenced ranges are also possible (e.g., greater than or equal to about 3,000 g/mol and less than or equal to about 1,000,000 g/mol). The number average molecular weight may be determined using gel permeation chromatography (GPC), nuclear magnetic resonance spectrometry (NMR), laser light scattering, intrinsic viscosity, vapor pressure osmometry, small angle neutron scattering, laser desorption ionization mass spectrometry, matrix assisted laser desorption ionization mass spectrometry (MALDI MS), or electrospray mass spectrometry or may be obtained from a manufacturer's specifications. Unless otherwise indicated the values of number average molecular weight described herein are determined by gel permeation chromatography (GPC).

In some embodiments, polymers in the lithium ion conductive film may have any suitable number of repeat units. For instance, the lithium ion conductive film may comprise one or more polymers having greater than or equal to about 10, greater than or equal to about 20, greater than or equal to about 50, greater than or equal to about 100, greater than or equal to about 200, greater than or equal to about 300, or greater than or equal to about 400. In some instances, the number of repeat units may be less than or equal to about 500, less than or equal to about 400, less than or equal to about 300, less than or equal to about 200, less than or equal to about 100, or less than or equal to about 50. Combinations of the above-referenced ranges are also possible (e.g., greater than or equal to about 10 and less than or equal to about 500). Other values of the number of repeat units in the first component are also possible. The number of repeat units may be determined using gel permeation chromatography (GPC), nuclear magnetic resonance (NMR), or may be obtained from a manufacturer's specifications.

In some embodiments, the lithium ion conductive film may be relatively thin. For instance, in some embodiments, the lithium ion conductive film may have a thickness of less than or equal to about 10 microns, less than or equal to about 5 microns, less than or equal to about 2 microns, less than or equal to about 1.5 microns, less than or equal to about 1 micron, less than or equal to about 0.8 microns, less than or equal to about 0.5 microns, less than or equal to about 0.1 microns, or less than or equal to about 0.05 microns. In some embodiments, the lithium ion conductive film may have a thickness of greater than or equal to about 0.001 microns, greater than or equal to about 0.002 microns, greater than or equal to about 0.005 microns, or greater than or equal to about 0.01 microns. All combinations of the above-referenced ranges are possible (e.g., greater than or equal to about 0.001 microns and less than or equal to about 10 microns, greater than or equal to about 0.1 microns and less than or equal to about 5 microns, greater than or equal to about 0.1 microns and less than or equal to about 2 microns, greater than or equal to about 0.5 microns and less than or equal to about 1.5 microns). The thickness may be measured as described herein in Example 2.

In some embodiments, the lithium ion conductive film may impart a relatively high ion conductivity to the battery separator. For instance, in some embodiments, the ion conductivity (e.g., lithium ion conductivity) of the battery separator may be greater than or equal to about 0.03 mS/cm, greater than or equal to about 0.05 mS/cm, greater than or equal to about 0.1 mS/cm, greater than or equal to about 0.2 mS/cm, greater than or equal to about 0.3 mS/cm, greater than or equal to about 0.4 mS/cm, greater than or equal to about 0.5 mS/cm, greater than or equal to about 0.6 mS/cm, greater than or equal to about 0.7 mS/cm, greater than or equal to about 0.8 mS/cm, or greater than or equal to about 0.9 mS/cm. In some instances, the ion conductivity (e.g., lithium ion conductivity) of the battery separator may be less than or equal to about 1.5 mS/cm, less than or equal to about 1.2 mS/cm, less than or equal to about 1.0 mS/cm, less than or equal to about 0.9 mS/cm, less than or equal to about 0.8 mS/cm, less than or equal to about 0.7 mS/cm, less than or equal to about 0.6 mS/cm, less than or equal to about 0.5 mS/cm, less than or equal to about 0.4 mS/cm, less than or equal to about 0.3 mS/cm, or less than or equal to about 0.2 mS/cm. All combinations of the above-referenced ranges are possible (e.g., greater than or equal to about 0.03 mS/cm and less than or equal to about 1.5 mS/cm, greater than or equal to about 0.1 mS/cm and less than or equal to about 1.0 mS/cm, greater than or equal to about 0.3 mS/cm and less than or equal to about 1.0 mS/cm). The ion conductivity may be measured as described herein in Example 2.

In some embodiments, the battery separator may have a relatively high lithium transfer number. For instance, in some embodiments, the lithium transfer number may be greater than or equal to about 0.1, greater than or equal to about 0.2, greater than or equal to about 0.4, greater than or equal to about 0.5, greater than or equal to about 0.6, greater than or equal to about 0.7, greater than or equal to about 0.8, or greater than or equal to about 0.9. In some instances, the lithium transfer number may be less than or equal to about 1, less than or equal to about 0.9, less than or equal to about 0.8, less than or equal to about 0.6, less than or equal to about 0.5, less than or equal to about 0.4, or less than or equal to about 0.2. All combinations of the above-referenced ranges are possible (e.g., greater than or equal to about 0.4 and less than or equal to about 1). As used herein, transfer number has its ordinary meaning in the art. For example, for an electrolyte that dissociates to give a single cationic and anionic species, the transfer number may be defined as the number of faradays of charge carried by cations across a reference plane (fixed relative to the solvent) when a total of one faraday of charge passes across the plane. The lithium transfer number may be determined as described in Lee, et al., Chem. Mater. 2014, 26, 2579-2585. Briefly, the Li transfer number may be determined by the combination of dc polarization and ac impedance analysis. The current versus time may be monitored at constant potential (10 mV) for 7 days, and the ac impedance spectra can be measured before and after polarization. The transfer number ($T_+$) was calculated using the following equation:

$$T_+ = [I^S(\Delta V - I^0 R_1^0)] / [I^0(\Delta V - I^S R_1^S)]$$

wherein $I^S$ and $I^0$ are the steady-state and the initial current determined by the dc polarization, respectively, $\Delta V$ is the dc potential applied across the cell (10 mV), and $R_1^0$ and $R_1^S$ are the interfacial resistance measured by the ac impedance analyzer before and after polarization, respectively.

In some embodiments, the battery separator may have a favorable total electrolyte permeability. For instance, in some embodiments, the total electrolyte permeability is less than or equal to about $6 \cdot 10^{-12}$ m$^2$, less than or equal to about $5 \cdot 10^{-12}$ m$^2$, less than or equal to about $4 \cdot 10^{-12}$ m$^2$, less than or equal to about $2 \cdot 10^{-12}$ m$^2$, less than or equal to about $1 \cdot 10^{-12}$ m$^2$, less than or equal to about $5 \cdot 10^{-13}$ m$^2$, less than or equal to about $2 \cdot 10^{-13}$ m$^2$, less than or equal to about $1.8 \cdot 10^{-13}$ m$^2$, less than or equal to about $1.6 \cdot 10^{-13}$ m$^2$, less than or equal to about $1.4 \cdot 10^{-13}$ m$^2$, or less than or equal to about $1.2 \cdot 10^{-13}$ m$^2$ and/or greater than or equal to about $1 \cdot 10^{-13}$ m$^2$ (e.g., greater than or equal to about $1 \cdot 10^{-13}$ m$^2$ and less than or equal to about $6 \cdot 10^{-12}$ m$^2$) The total electrolyte permeability may be measured as described herein in Example 2.

In some embodiments, a lithium-air battery comprising one or more of the battery separators described herein may have a relatively high cyclability. For instance, in some embodiments, the cyclability may be greater than or equal to about 40 cycles, greater than or equal to about 45 cycles, greater than or equal to about 50 cycles, greater than or equal to about 55 cycles, greater than or equal to about 60 cycles, greater than or equal to about 65 cycles, greater than or equal to about 70 cycles, greater than or equal to about 75 cycles, greater than or equal to about 100 cycles, greater than or equal to about 150 cycles, greater than or equal to about 200 cycles, greater than or equal to about 250 cycles, greater than or equal to about 300 cycles, greater than or equal to about 350 cycles, greater than or equal to about 400 cycles, or greater than or equal to about 450 cycles. In some embodiments, the cyclability may be less than or equal to about 500 cycles, less than or equal to about 450 cycles, less than or equal to about 400 cycles, less than or equal to about 350 cycles, less than or equal to about 300 cycles, less than or equal to about 250 cycles, less than or equal to about 200 cycles, less than or equal to about 150 cycles, less than or equal to about 100 cycles, less than or equal to about 95 cycles, less than or equal to about 90 cycles, less than or equal to about 85 cycles, or less than or equal to about 80 cycles. All combinations of the above-referenced ranges are also possible (e.g., greater than or equal to about 40 cycles and less than or equal to about 500 cycles, greater than or equal to about 40 cycles and less than or equal to about 100 cycles). As used herein, cyclability has its ordinary meaning in the art and refers to the number of times the battery may undergo a charge-discharge cycle before the cycle voltage drops to zero at a constant current. The cyclability may be measured as described in Example 2. Briefly, for the lithium transfer number, dendrite growth, and cycling behavior measurements, two electrode Li cells are assembled in an Ar-filled glovebox with a test membrane and liquid electrolyte. The area of the Li electrode is 0.97 cm$^2$ (1.11 cm diameter circles), and two stainless steel rod current collectors are used at both ends of the Swagelok cells to connect the electrode to a potentiostat (Solartron 1470E cell test system). 20 μL of 1,2-dimethoxyethane (DME) in 0.1 M LiClO$_4$ is used as the liquid electrolyte for each sample. Before electrochemical analysis, all samples are vacuum-dried and stored in an Ar-filled glovebox for at least 1 week. All electrochemical measurements are conducted multiple times (e.g., three times) to confirm the results.

In some embodiments, a lithium-air battery comprising one or more of the battery separators described herein may have a relatively long life time (e.g., short circuit time). For instance, in some embodiments, the short circuit time of the battery may be greater than or equal to about 50 hours, greater than or equal to about 75 hours, greater than or equal to about 100 hours, greater than or equal to about 125 hours, greater than or equal to about 150 hours, greater than or equal to about 175 hours, greater than or equal to about 200 hours, greater than or equal to about 225 hours, greater than or equal to about 250 hours, or greater than or equal to about 300 hours. In certain embodiments, the short circuit time of the battery may be less than or equal to about 400 hours, less than or equal to about 375 hours, less than or equal to about 350 hours, less than or equal to about 300 hours, less than or equal to about 275 hours, less than or equal to about 250 hours, less than or equal to about 225 hours, or less than or equal to about 200 hours. All combinations of the above-referenced ranges are also possible (e.g., greater than about 50 hours and less than or equal to about 400 hours). Short circuit time is defined as the time at which the measured voltage across the battery separator is below 0.1 mV and was measured as described in Example 2.

The following examples are intended to illustrate certain embodiments of the present invention, but do not exemplify the full scope of the invention.

Example 1

Energy consumption and global climate change have forced society to look for an alternative energy conversion and storage system. Electrification of road transportation and large-scale development of renewable energy are strategies to address these environmental issues. A major technical hurdle toward this goal is the insufficient storage capacity of current energy storage systems. Rechargeable Lithium-ion batteries have been considered as a possible solution due to their high energy density and efficiency. However, the highest energy storage of a Li-ion battery is too low for certain application, such as electrical vehicles.

Lithium-air batteries are a promising alternative to Li-ion batteries, because Li-air batteries are capable of significantly higher energy storage than that of other rechargeable batteries. Though the estimated practical energy density of Li-air batteries is lower (i.e., about 1700 Wh/kg) than the theoretical value (i.e., about 12 kWh·kg), the practical energy density is sufficient to drive electrical vehicles of more than 500 km per charge, which is comparable to gasoline vehicles.

For both Li-ion batteries and Li-air batteries, the use of Li metal as an anode material is a good choice to increase energy density, because Li metal has the highest specific capacity (3862 mAh/g) and the lowest electrochemical potential (−3.04 V vs. SHE) of any Li based anode material. However, the development of commercial rechargeable batteries based on Li metal as the anode has been hindered due to the inherent problems of using Li metal. Li metal is highly reactive with most electrolyte solvents, which leads to electrolyte decomposition and the formation of a stable solid electrolyte interphase (SEI) on the Li surface. The SEI layer is ionically conductive and can prevent further decomposition of electrolyte and Li metal. During the charge/discharge cycle, however, formation of a uniform and stable SEI on Li metal is difficult to control, such that Li deposition occurs with dendritic morphologies. It is recognized that the growth of Li dendrites is accelerated at local points of high Li ion flux due to intrinsic and uncontrollable inhomogeneity. Li dendritic growth can result in the penetration of the SEI layer and porous membrane separator thereby leading to an internal short circuit of the battery. This results in low charge/discharge efficiency, poor cyclability, and can create a safety hazard. Most efforts to suppress Li dendritic growth and increase stability have been related to forming stable SEI layers or use of solid-state electrolytes or ceramic separators. Conventional ceramic separators, however, are undesirable because they are extremely brittle, fragile and can add a substantial amount of weight to the device. In fact, it can make up as much as 20% of the total weight of the battery, which is an issue for most standard Li and Li-Air battery applications such as vehicle batteries and portable energy devices. The lack of flexibility and large volume of thick ceramic porous membranes in stacked cells can hinder the realization of Li-rechargeable batteries in complex geometries or in flexible battery technologies. Layer-by-layer (LbL) technology affords thin films on a polymer support that are compatible with flexible batteries with any kind of geometry, thus reducing both the weight and volume of stacked cells, while providing the selective transport of Li ions from the anode and the controlled permeability and mechanical stability required for the operation of the battery. In addition, spray LbL can greatly reduce the processing time compared to dipping LbL and can be used for the mass-production of large area films.

In this example, the Li-anode protective layers for Li-air batteries designed to suppress Li dendritic growth on the anode surface and enhance the cyclability of batteries are described. High ionic conductivity, longer dendrite short circuit time, and lower electrolyte permeability are important properties for Li-anode protective layer. For both anode-protection and separation between anode and cathode, a simple and universal way to modify commercially available polypropylene (PP) porous membrane with ion-conductive polymer and graphene oxide (GO) via spray Layer-by-Layer (LbL) assembly was developed. To reduce processing time, spray LbL was introduced. With spray LbL, the process time went from 8 hours to 10 min for the deposition of 6 tetralayers.

Figure 2A:
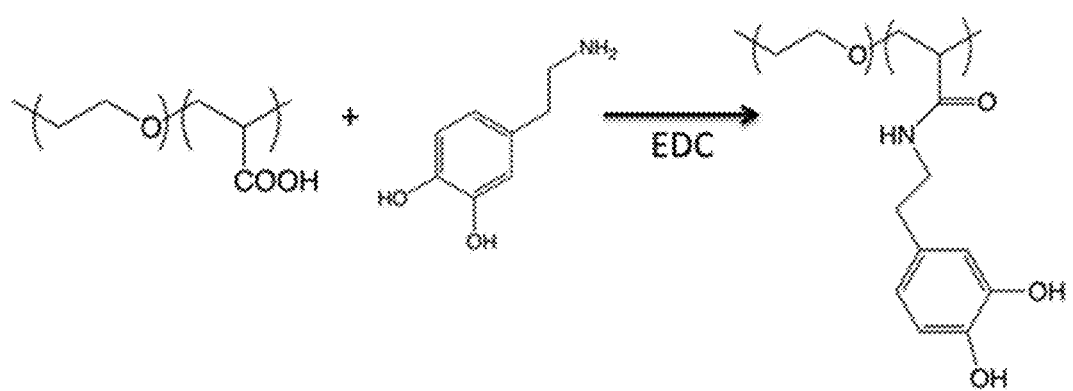
FIG. 2A shows a scheme for the synthesis of a polyethylene oxide/polyacrylic acid block copolymer comprising one or more catechol groups (PEO-PAAC)
Figure 2B:
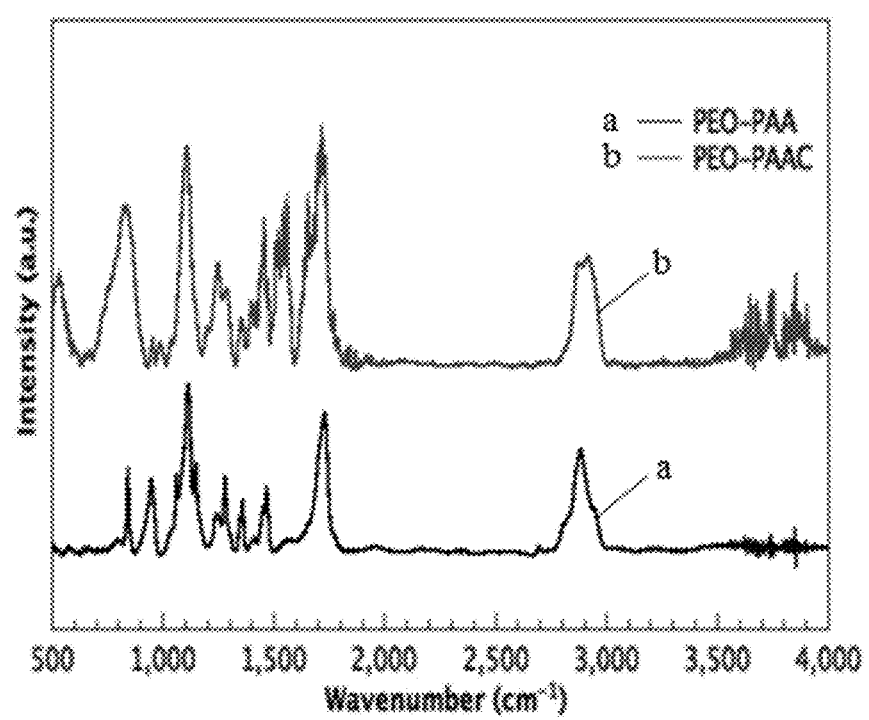
FIG. 2B shows an FTIR spectrum of polyethylene oxide/polyacrylic acid block copolymer (PEO-PAA) and polyethylene oxide/polyacrylic acid block copolymer comprising one or more catechol groups (PEO-PAAC)

However, to coat the pristine polypropylene membrane, the polymers for LbL and/or the hydrophobic surface of pristine polypropylene porous membrane had to be modified, because polypropylene is very hydrophobic and incompatible with hydrophilic coating material. To coat the membrane, a PEO-b-PAA block copolymer was modified with dopamine and used it as a base layer for pristine porous membrane and an interlayer between PEO and GO. The catechol group of dopamine is known as a universal adhesive in wet and dry environments. Carboxylic acid group of PAA block formed an amide bond with the amine group of dopamine, as shown in FIGS. 2A and 2B. The catechol-modified PEO-b-PAA block copolymer (PEO-PAAC) increased the adhesion between hydrophobic pristine porous membrane and hydrophilic polyelectrolytes as well as between PEO and GO. FIG. 2A shows a scheme for the synthesis of catechol-modified PEO-b-PAA block copolymer (PEO-PAAC). FIG. 2B shows an FTIR spectrum of catechol-modified PEO-b-PAA block copolymer (PEO-PAAC) and PEO-b-PAA block copolymer.

Figure 2C:
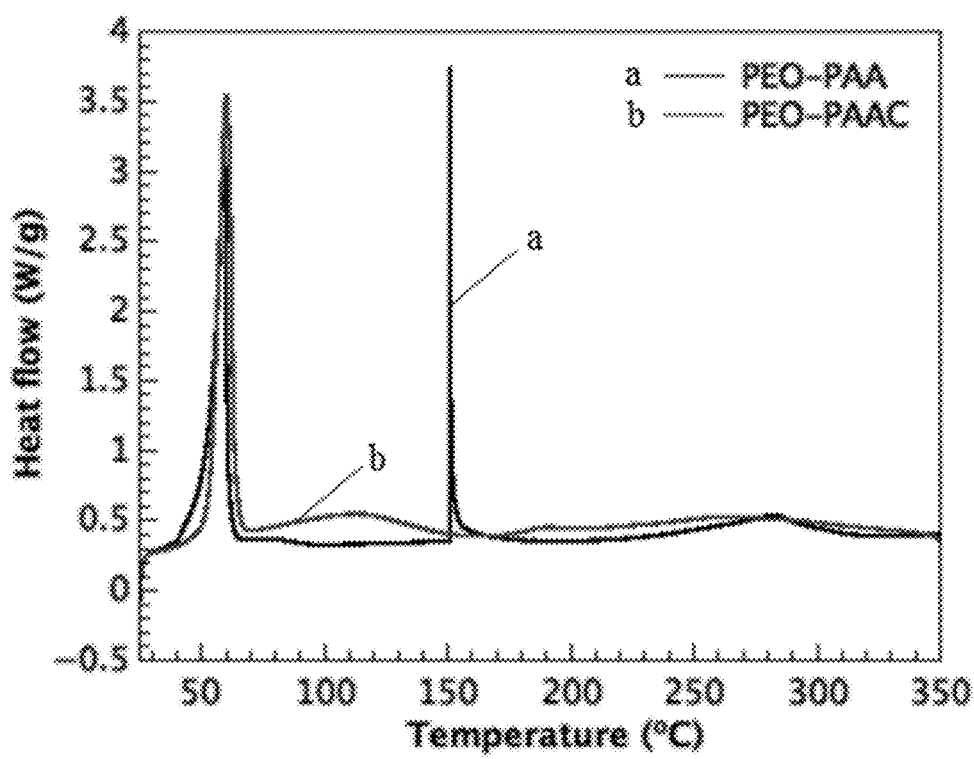
FIG. 2C shows a differential scanning calorimetry spectrum of polyethylene oxide/polyacrylic acid block copolymer (PEO-PAA) and polyethylene oxide/polyacrylic acid block copolymer comprising one or more catechol groups (PEO-PAAC)
Figure 3A:
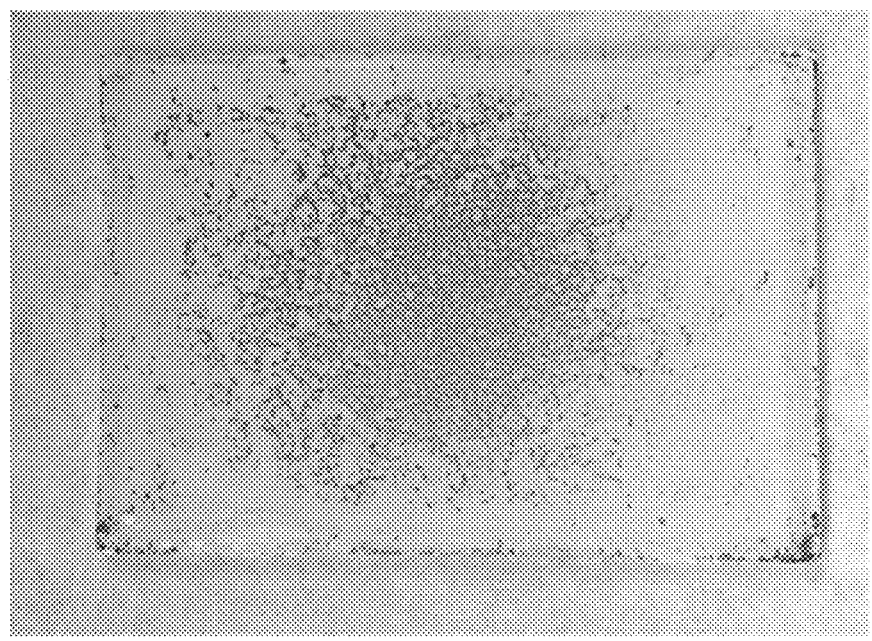
FIG. 3A shows an image of a layer-by-layer film including repeating core units of polyethylene oxide/polyacrylic acid block copolymer; polyethylene oxide; polyethylene oxide/polyacrylic acid block copolymer; and graphene oxide formed via spray layer-by-layer.
Figure 3B:
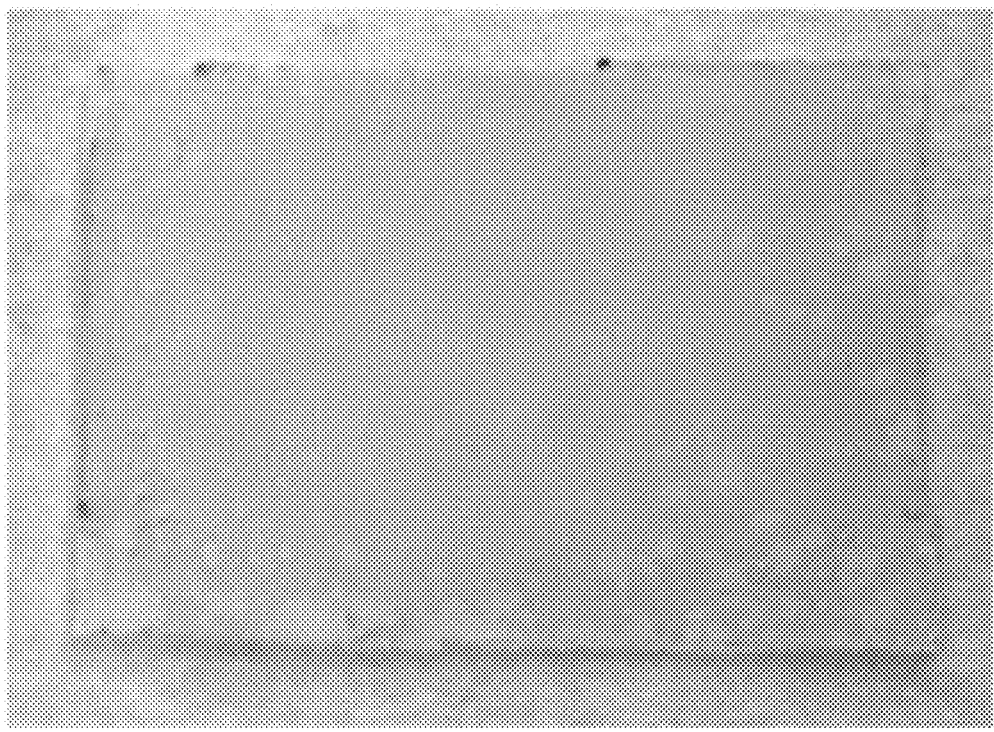
FIG. 3B shows an image of a layer-by-layer film including repeating core units of polyethylene oxide/polyacrylic acid block copolymer comprising one or more catechol groups; polyethylene oxide; polyethylene oxide/polyacrylic acid block copolymer comprising one or more catechol groups; and graphene oxide formed via spray layer-by-layer.
Figure 3C:
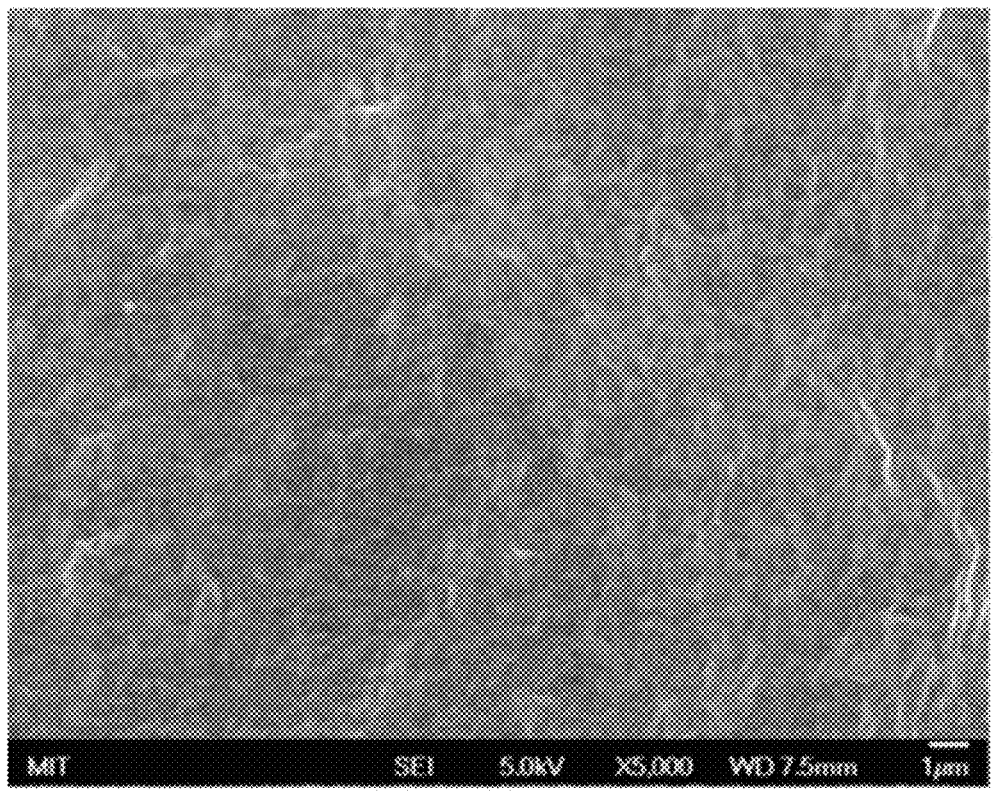
FIG. 3C shows a scanning electron microscopy top view image of a layer-by-layer film including repeating core units of polyethylene oxide/polyacrylic acid block copolymer comprising one or more catechol groups; polyethylene oxide; polyethylene oxide/polyacrylic acid block copolymer comprising one or more catechol groups; and graphene oxide formed via spray layer-by-layer.
Figure 3D:
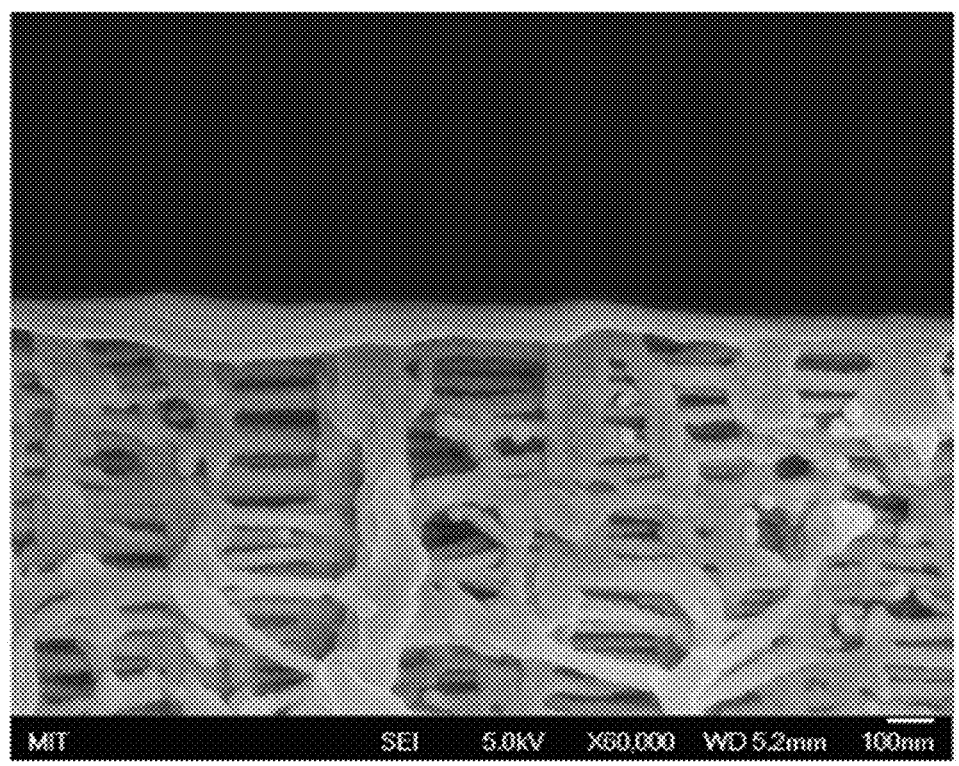
FIG. 3D shows a scanning electron microscopy cross-sectional view image of a layer-by-layer film including repeating core units of polyethylene oxide/polyacrylic acid block copolymer comprising one or more catechol groups; polyethylene oxide; polyethylene oxide/polyacrylic acid block copolymer comprising one or more catechol groups; and graphene oxide formed via spray layer-by-layer.

In addition, catechol groups can crosslink each other at elevated temperature, leading to enhanced mechanical and barrier properties, as shown in FIG. 2C. FIG. 2C shows a differential scanning calorimetry spectrum of catechol-modified PEO-b-PAA block copolymer (PEO-PAAC) and PEO-b-PAA block copolymer. When PEO-PAAC interlayer was deposited between PEO and GO layers, the film was uniformly coated on PP substrate. However, when only a PEO/GO film was used, the coating was not uniform and GO was aggregated as shown in FIG. 3A. FIG. 3A shows an image of a layer-by-layer film including PEO-PAA/PEO/PEO-PAA/GO tetralayers formed via spray layer-by-layer. Films containing PEO-PAAC/PEO/PEO-PAAC/GO tetralayers were built on polypropylene porous membrane using spray LbL and crosslinked at 80° C. for 24 h. As a result, uniform films could be deposited on polypropylene porous membrane in a relatively short time. As shown in FIGS. 3B-3D, the films had improved barrier properties. FIG. 3B shows an image of a layer-by-layer film including PEO-PAAC/PEO/PEO-PAAC/GO tetralayers formed via spray layer-by-layer. FIG. 3C shows a scanning electron microscopy top view image of a layer-by-layer film including PEO-PAAC/PEO/PEO-PAAC/GO tetralayers formed via spray layer-by-layer. FIG. 3D shows a scanning electron microscopy cross-sectional view image of a layer-by-layer film including PEO-PAAC/PEO/PEO-PAAC/GO tetralayers formed via spray layer-by-layer.

For example, the electrolyte permeability was 9.09567E-13 for a non-crosslinked 20 tetralayer film and 1.64364E-13 for a crosslinked 20 tetralayer film.

Figure 4A:
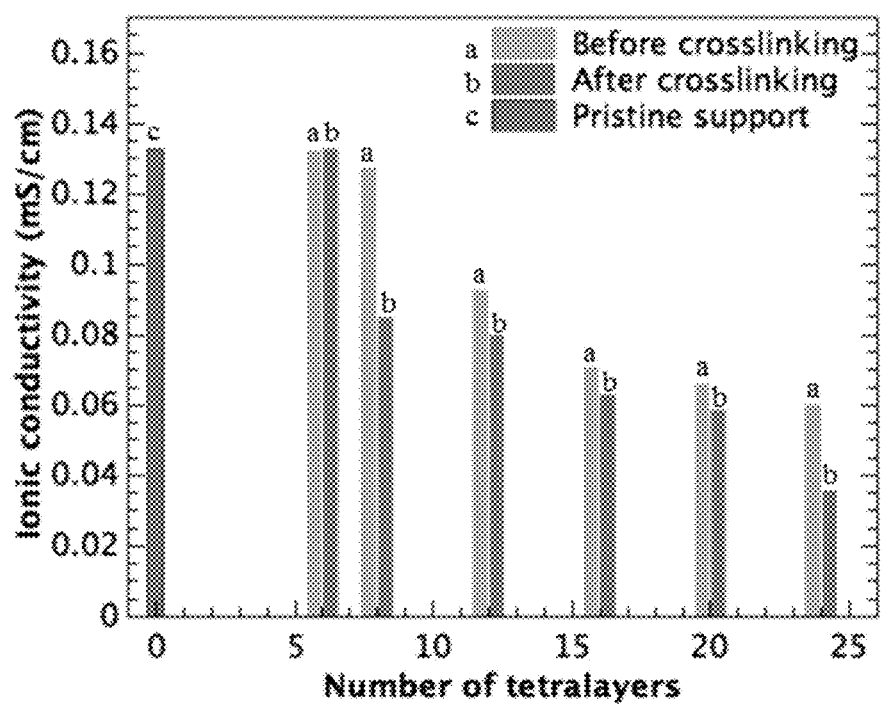
FIG. 4A shows a graph of ionic conductivity versus number of tetralayers for layer-by-layer films before and after crosslinking of the polyethylene oxide/polyacrylic acid block copolymer comprising one or more catechol groups.
Figure 4B:
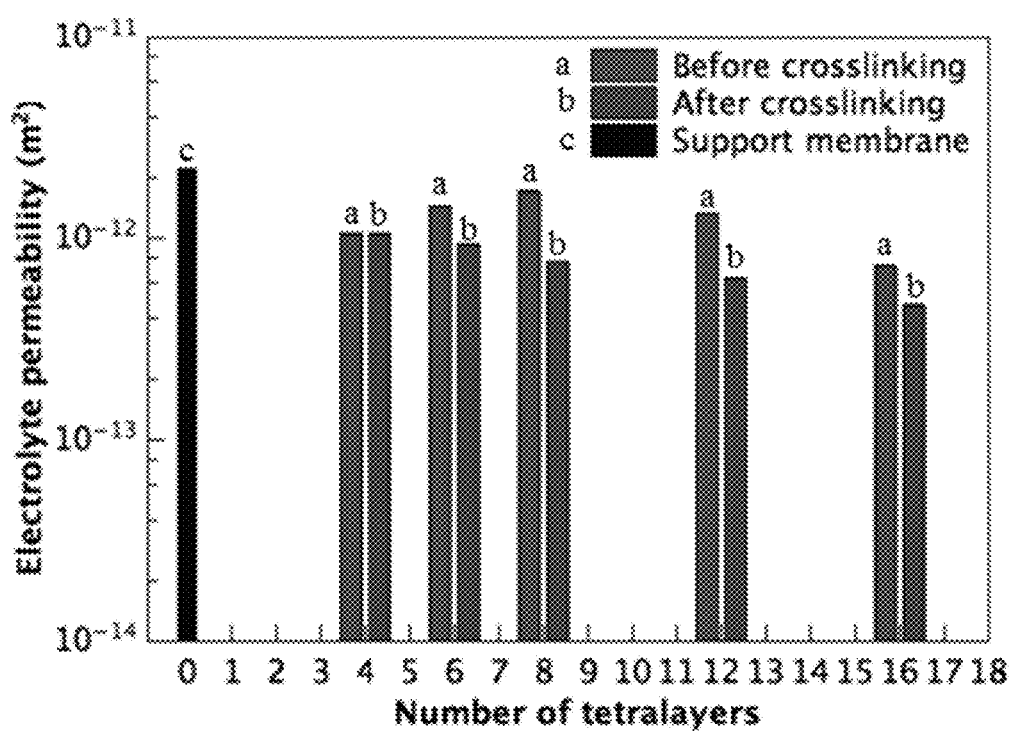
FIG. 4B shows a graph of electrolyte permeability versus number of tetralayers of a layer-by-layer film before and after crosslinking of the polyethylene oxide/polyacrylic acid block copolymer comprising one or more catechol groups.

The ionic conductivity was only slightly affected as a result of crosslinking. The ionic conductivity was 0.127 mS/cm before crosslinking and 0.085 mS/cm after crosslinking as shown in FIGS. 4A and 4B. FIG. 4A shows a graph of ionic conductivity versus number of tetralayers of the layer-by-layer film before and after crosslinking of the catechol groups of the PEO-PAAC. FIG. 4B shows a graph of electrolyte permeability versus number of tetralayers of the layer-by-layer film before and after crosslinking of the catechol groups of the PEO-PAAC.

Figure 5A:
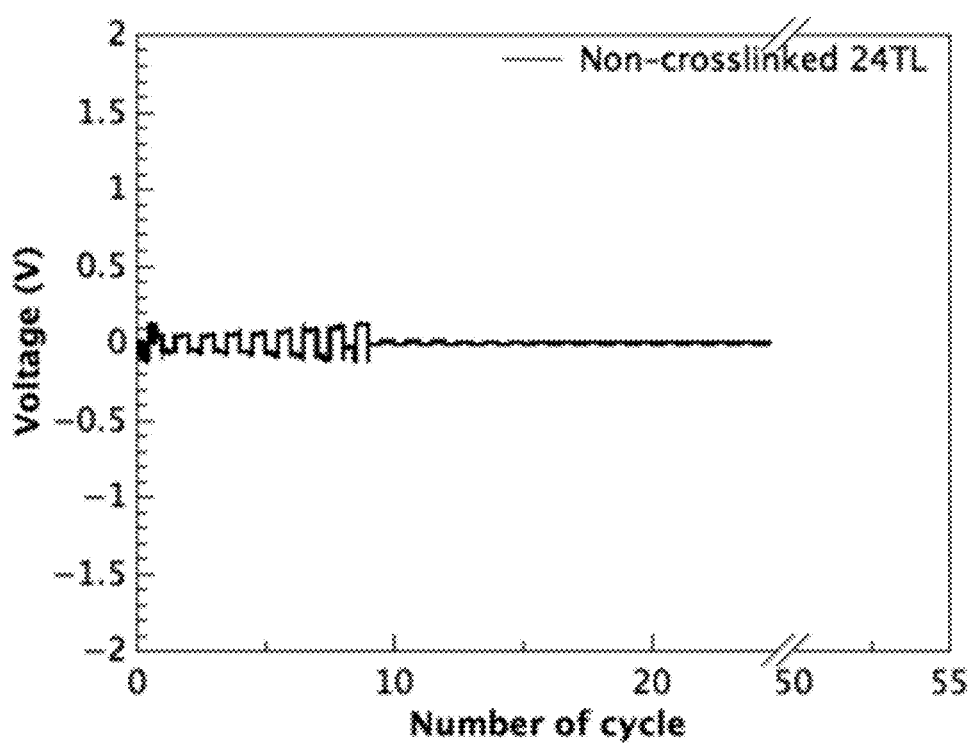
FIG. 5A shows the cyclability of a battery comprising a lithium anode, a cathode, and a battery separator comprising the layer-by-layer film before crosslinking of the polyethylene oxide/polyacrylic acid block copolymer comprising one or more catechol groups.
Figure 5B:
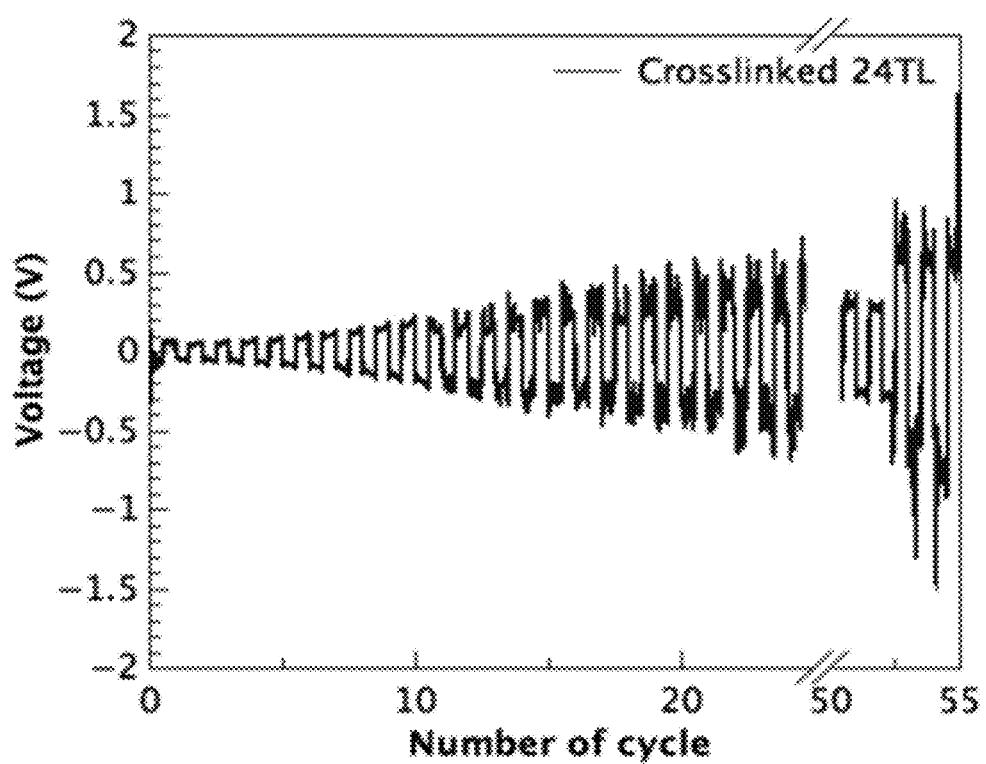
FIG. 5B shows the cyclability of a battery comprising a lithium anode, a cathode, and a battery separator comprising the layer-by-layer film after crosslinking of the polyethylene oxide/polyacrylic acid block copolymer comprising one or more catechol groups.

In addition, crosslinked tetralayer film effectively suppressed Li dendritic growth and enhanced cyclability of Li electrode. Crosslinked 24 tetralayer films cycled over 56 times, while non-crosslinked one withstood only 9 cycles, as shown in FIGS. 5A and 5B. FIG. 5A shows the cyclability of a battery including a lithium anode, a cathode, and a battery separator having the layer-by-layer films before crosslinking of the catechol groups. FIG. 5B shows the cyclability of a battery comprising a lithium anode, a cathode, and a battery separator having the layer-by-layer films after crosslinking of the catechol groups.

Example 2

This example describes the materials and methods used in Example 1.

Materials.

PEO (Mw=100,000 Da), 1,2-dimethoxyethane (DME) and hydrochloric acid (HCl) were obtained from Sigma-Aldrich, Inc. PAA (Mw=50,000 Da) was purchased from Polysciences, Inc. Polypropylene (PP) porous membrane (Celgard® 2400) were generously provided by Celgard, LLC. Custom-made electrolyte (0.1 M LiClO$_4$ in dimethoxyethane) for electrochemical analysis was ordered from Novolyte technologies. Li foil was obtained from Alfa Aesar. GO was synthesized by modified Hummer's method and used after dialysis at deionized water for 7 days. The average size of single sheet was 1.1 µm of diameter and thickness was about 1 nm.

Layer-by-Layer Assembly on PP Support.

Layer-by-Layer (LbL) film was constructed using a custom-made programmable spray LbL device. PP porous membranes were attached on glass substrate by narrow double sided-tape on all edges of porous membrane and treated O$_2$-plasma for 30 seconds. PEO-PAAC solution was sprayed on the support membrane for 10 seconds and rinsing solution was sprayed for 2 seconds. GO solution, PEO-PAAC solution, and PEO solution were sprayed in the same manner, followed by the same rinsing process using deionized water. This formed one tetralayer (TL). This procedure was repeated until the desired number of TLs was formed such as 4 TL, 6 TL, 12 TL and 24 TL. 20 µM of polymers was dissolved in all polymer solutions and 10 mM of LiBOB was included for all polymer and polymer rinse solutions. For LbL assembly, pH of all solutions was adjusted to 2.5 with a 0.1 M of HCl aqueous stock solution for hydrogen bonding between PEO and PEO-PAAC and GO.

Characterization of Samples.

Scanning electron microscopy (SEM) images were captured using JEOL 6700F at 5 kV, and 30 Å of Au—Pd was sputter-deposited on the samples prior to imaging to suppress charging. Cross-sectional images were taken from samples immersed in liquid nitrogen and snapped. A profilometer (Veeco Dektak 150) was used to record the thickness of LbL layers five times at different locations. The thicknesses were averaged to yield one data point and the standard deviation of the measurements was taken as the error.

Electrolyte permeability was determined by using the modified wet-cup method. The porous membrane separated a dual-chamber apparatus, which contained electrolyte at one side and was exposed to air at the other side. The weight loss of electrolyte was monitored by a precision balance at room temperature. The permeability of electrolyte was obtained from the volume change of electrolyte and the thickness of the porous membrane as $$p = \frac{\mu Q \Delta \chi}{A \Delta P} \quad (1)$$

where p is the permeability of a medium (m$^2$), µ is the dynamic viscosity of the fluid (Pa·s) (4.70×10$^{-4}$ Pa·s for DME), Q is volume flow rate of the phase (m$^3$/s, density of DME is 0.867 g/m$^3$), $\Delta \chi$ is the thickness of the bed of the porous medium (m), A corresponds to the cross sectional area for mass transfer (3.14×10$^{-4}$ m$^2$), and $\Delta P$ is the applied pressure difference (Pa).

Electrochemical Analysis.

For electrochemical analysis, 20 µl of DME 0.1 M LiClO$_4$ was used as the electrolyte for each sample. Before electrochemical analysis, all samples were vacuum-dried and stored in an Ar filled glovebox for at least 1 week. All electrochemical measurements were conducted two to three times to confirm the results. Ionic conductivity measurements were carried out by impedance spectroscopy with a Solartron 1260 impedance analyzer by sweeping the frequency from 1 MHz to 1 Hz at 10 mV of ac amplitude. The test porous membrane with electrolyte was placed between two stainless steel electrodes inside a Swagelok cell. For dendrite growth and cycling behavior measurements, two-electrode Li cells were assembled in an Ar filled glovebox with test porous membrane and liquid electrolyte. The area of the Li electrode was 0.97 cm$^2$ (1.11 cm diameter circles) and two stainless steel rod current collectors were used at both ends of the Swagelok cells to connect the electrode to a potentiostat (Solartron 1470E Cell Test System). Constant-current charging of the cells was conducted at current density of 0.2 mA/cm$^2$ to observe Li dendrite growth. The time evolution of voltage between two Li electrodes was recorded and the short circuit time ($t_{sc}$) was defined as the time when a rapid drop of the cell voltage was observed. Charge-discharge cycling also was carried out by passing a constant current density (0.2 mA/cm$^2$) and reversing its polarity every 4 h.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A lithium-air battery separator, comprising:
a porous membrane; and
a lithium ion conductive film on at least a portion of a surface of the porous membrane, wherein the film comprises:
a first and a second adhesive layer comprising a polymer having one or more catechol groups;
a barrier layer; and
a lithium ion conductive layer positioned between the first and the second adhesive layers.

2. A lithium-air battery separator, comprising:
a porous membrane; and
a lithium ion conductive film comprising two or more repeating core units, the repeating core unit comprising:
a graphene oxide layer,
a polyethylene oxide layer, and
two adhesive layers comprising a polymer comprising polyethylene oxide and catechol groups.

3. The lithium-air battery separator of claim 1, wherein the lithium ion conductive film has a thickness of less than or equal to about 5 microns.

4. The lithium-air battery separator of claim 3, wherein the lithium ion conductive film has a thickness of less than or equal to about 1 micron.

5. The lithium-air battery separator of claim 1, wherein the lithium ion conductive film comprises cross-links.

6. The lithium-air battery separator of claim 1, wherein the lithium ion conductive film is non-covalently attached to the porous membrane.

7. The lithium-air battery separator of claim 1, wherein the lithium ion conductive film covers at least 90% of at least one surface of the porous membrane.

8. The lithium-air battery separator of claim 1, wherein the porous membrane comprises one or more polyolefins.

9. The lithium-air battery separator of claim 1, wherein the lithium-air battery separator has an ion conductivity of greater than or equal to about 0.1 mS/cm.

10. The lithium-air battery separator of claim 9, wherein the lithium-air battery separator has an ion conductivity of greater than or equal to about 0.3 mS/cm and less than or equal to about 1 mS/cm.

11. The lithium-air battery separator of claim 7, wherein the lithium ion conductive film covers at least 90% of the surface area of the porous membrane.

12. The lithium-air battery separator of claim 1, wherein the lithium-air battery separator has a lithium transfer number of greater than or equal to about 0.4.

13. The lithium-air battery separator of claim 1, wherein the lithium-air battery separator has a total electrolyte permeability of greater than or equal to about $1 \cdot 10^{-13}$ $m^2$ and less than or equal to about $6 \cdot 10^{-12}$ $m^2$.

14. The lithium-air battery separator of claim 1, wherein the barrier layer comprises an organic material.

15. The lithium-air battery separator of claim 1, wherein the barrier layer comprises graphene oxide.

16. The lithium-air battery separator of claim 1, wherein the polymer comprises PAA-catechol.

17. The lithium-air battery separator of claim 16, wherein the polymer is PEO-PAA-catechol.

18. The lithium-air battery separator of claim 1, wherein the lithium ion conductive layer comprises PEO.

19. The lithium-air battery separator of claim 1, wherein the barrier layer is adjacent to the first adhesive layer or the second adhesive layer.

20. A lithium-air battery comprising the lithium-air battery separator of claim 1.

21. The lithium-air battery of claim 20, wherein the lithium-air battery has a cyclability of greater than or equal to about 40 cycles.

22. The lithium-air battery of claim 21, wherein the lithium-air battery has a short circuit time of greater than or equal to about 150 hours.

23. An article, comprising:
a porous membrane; and
a lithium ion conductive material associated with the porous membrane, wherein the material comprises:
 a first and a second adhesive layer, at least one of the first and second adhesive layers comprising a polymer having one or more catechol groups; and
 a barrier layer positioned adjacent to the first or the second adhesive layers.

\* \* \* \* \*